United States Patent [19]

Turner, Jr.

[11] 4,253,716
[45] Mar. 3, 1981

[54] CARRIER FOR GAS CYLINDERS

[75] Inventor: James A. Turner, Jr., Charlotte, N.C.

[73] Assignee: National Welders Supply Co., Inc., Charlotte, N.C.

[21] Appl. No.: 21,710

[22] Filed: Mar. 19, 1979

[51] Int. Cl.³ .................. A47B 81/00; A47B 97/00; A47G 29/00

[52] U.S. Cl. .................. 312/100; 312/214; 312/250; 312/280; 312/DIG. 33; 206/373; 211/71; 248/79; 280/47.26

[58] Field of Search ............. 312/108, 100, 280, 249, 312/250, 214, DIG. 33, 263, 330 R, 206, 207; 248/79, 80, 83, 89, 75, 129; 206/349, 373; 269/51, 52; 211/71, 74; 128/203, 145.8, 205.24; 137/343; 220/408, 469

[56] References Cited

U.S. PATENT DOCUMENTS

| | | | |
|---|---|---|---|
| D. 163,327 | 5/1951 | Rose . | |
| 476,150 | 5/1892 | Knight . | |
| 873,143 | 12/1907 | Wirt | 248/129 |
| 1,284,022 | 11/1918 | Wright | 248/89 |
| 1,967,699 | 7/1934 | Young . | |
| 2,123,031 | 7/1938 | Weiner . | |
| 2,243,249 | 5/1941 | Craig | 220/408 |
| 2,634,189 | 4/1953 | Hill | 312/250 |
| 2,682,932 | 7/1954 | Howard | 312/280 |
| 3,612,639 | 10/1971 | Williams | 312/330 |
| 3,845,968 | 11/1974 | Larson . | |
| 3,942,669 | 3/1976 | Savage | 312/245 |
| 3,944,310 | 3/1976 | Welsh | 312/263 |
| 3,992,034 | 11/1976 | Smith, Sr. . | |
| 4,005,800 | 2/1977 | Schurman | 220/469 |
| 4,042,288 | 8/1977 | Litchfield | 312/330 R |
| 4,068,760 | 1/1978 | Johnson | 211/74 |
| 4,106,829 | 8/1978 | Dolle et al. | 312/280 |

*Primary Examiner*—Alexander Grosz
*Attorney, Agent, or Firm*—Richards, Shefte & Pinckney

[57] ABSTRACT

A carrier for gas cylinders and hoses having double-walled integral bottom, back and side walls, with a front wall connected by shouldered tabs in lipped slots in offsets in the edges of the bottom and side walls. The front wall has a cylindrical reel formed thereon and projecting outwardly for winding hoses thereon. The outer end of the reel is partially covered by a semi-circular end wall to form an article storage compartment within the reel. The back wall is hollow and has an inner wall portion spaced from an outer wall portion and having a pair of cylinder retaining recesses formed therein, and the front wall has a divider segment projecting inwardly to facilitate retention of gas cylinders in said recesses. The inner wall portion of the back wall has a shoulder at the top of said recesses with a hole for receiving welding rods, which are supported on an interior shelf formed in said inner wall portion.

18 Claims, 12 Drawing Figures

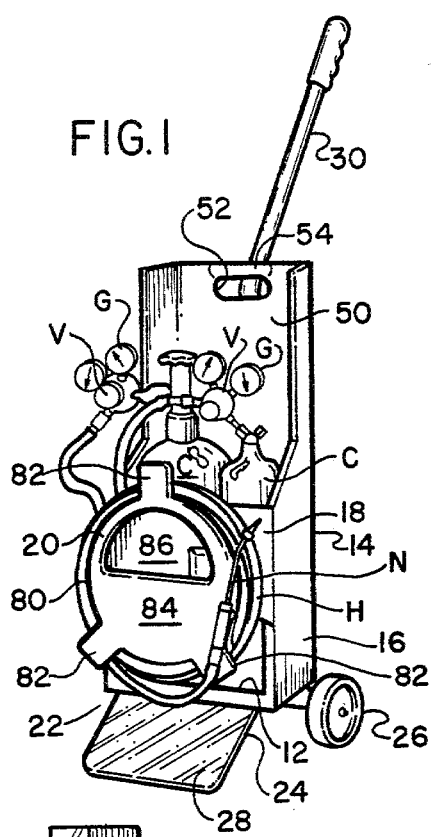
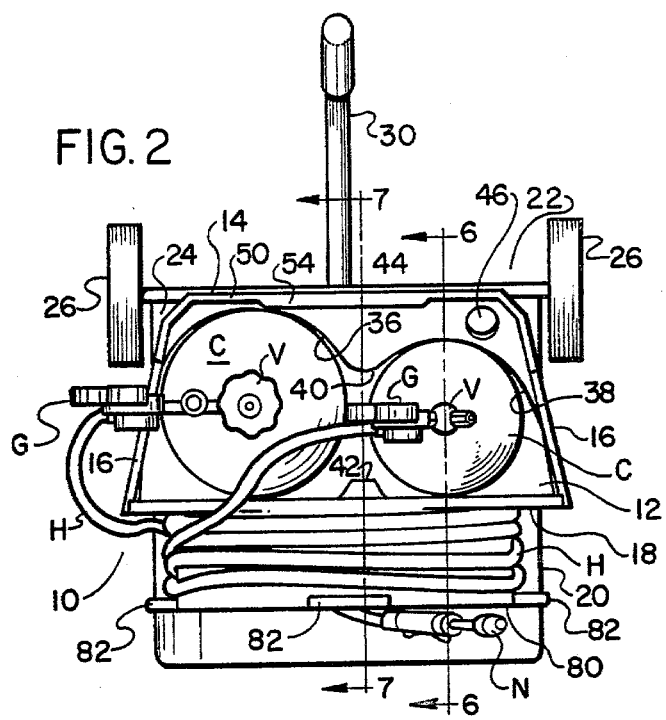
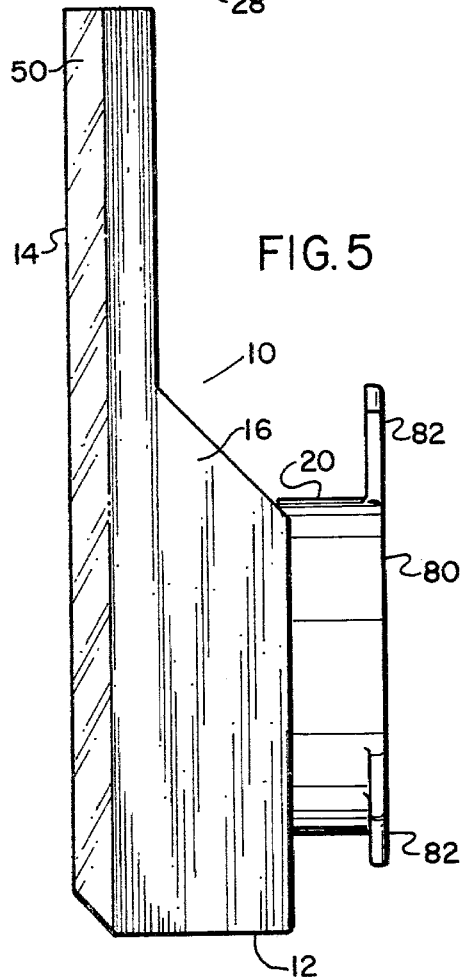
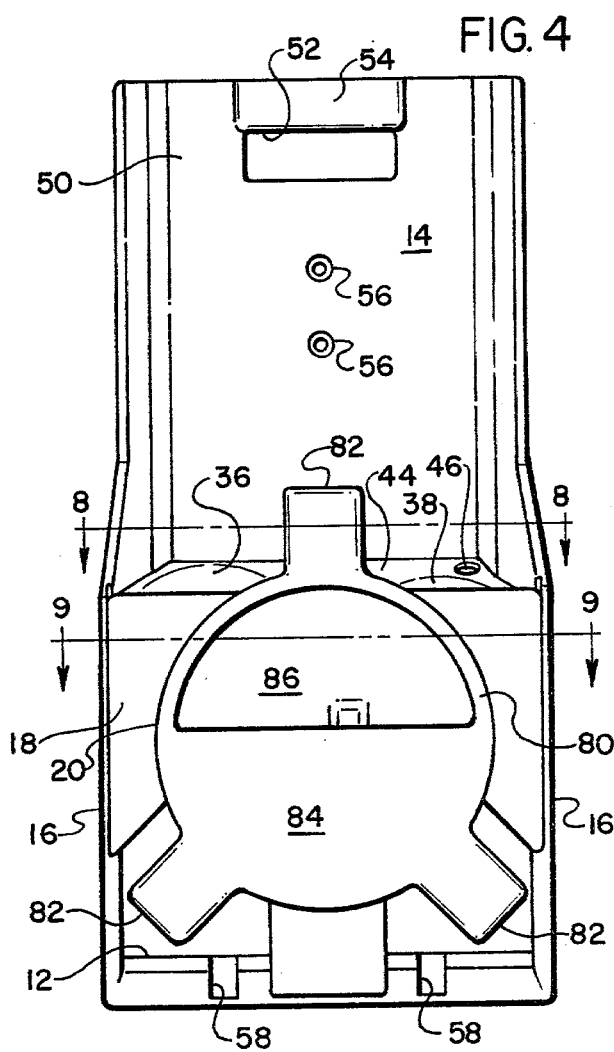

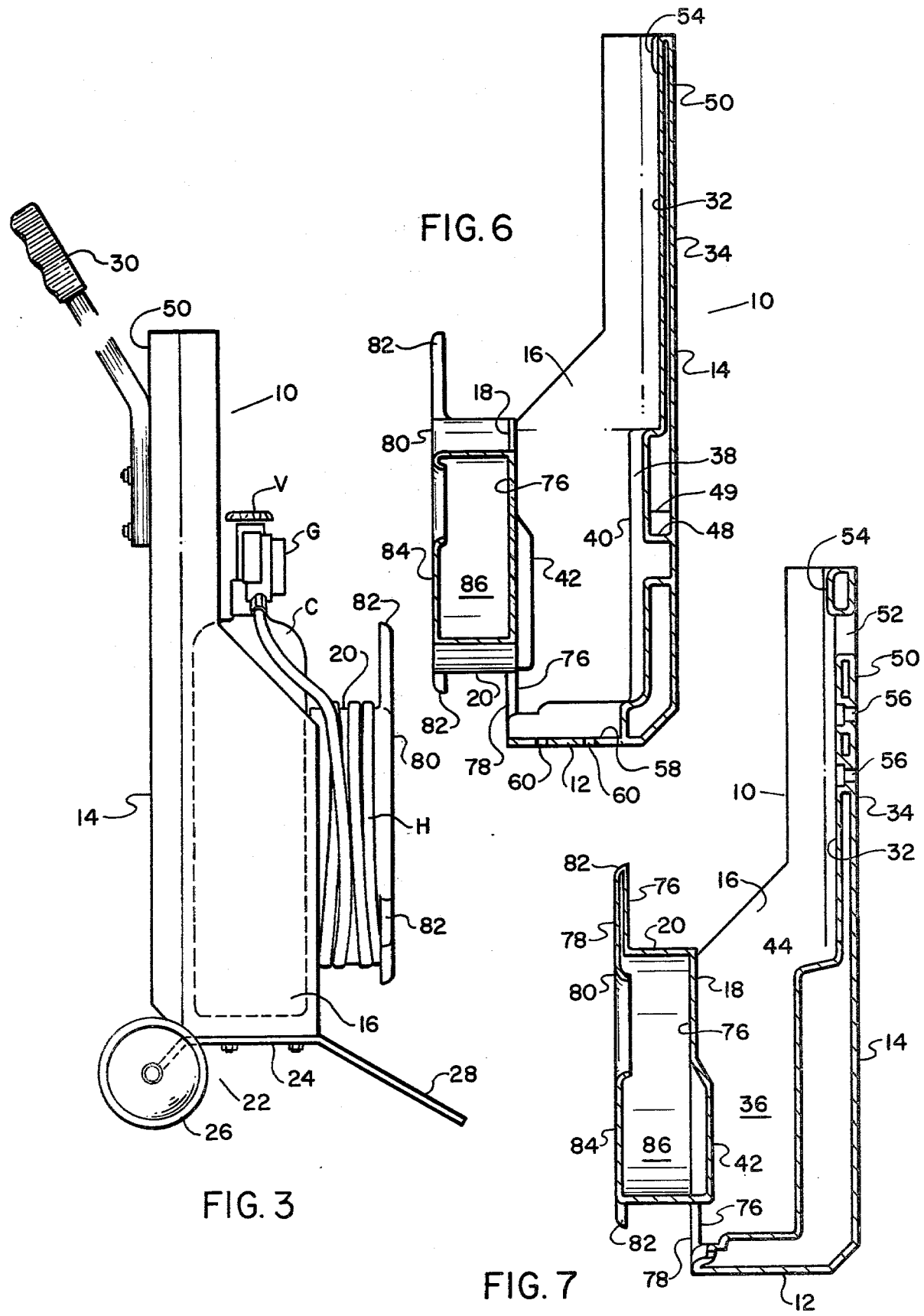

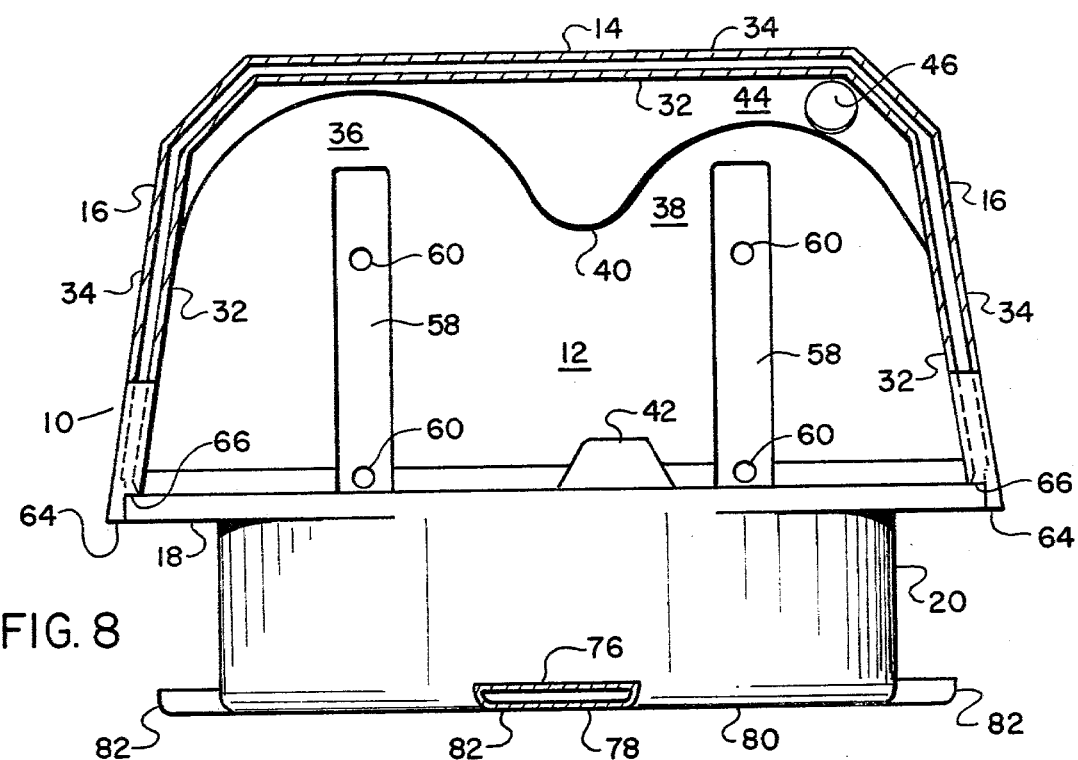

CARRIER FOR GAS CYLINDERS

BACKGROUND OF THE INVENTION

The present invention relates to carriers, and more particularly to carriers for gas cylinders.

The prior art includes carriers for gas cylinders, and one known prior art carrier of this general type is made with integral bottom, back, side and front walls that form an open-topped enclosure for gas cylinders. The back wall projects upwardly beyond the side walls to provide a handle portion, with this projecting portion being hollow and double-walled whereas the bottom, side, and front walls and the lower portion of the back wall are single-walled. At the bottom of the projecting portion the inner wall portion of the back wall terminates by extending forwardly and has circular holes therein for receipt of gas cylinders in the holes between the back, side and front walls. Projections are formed on the side walls to support welding rods, which are thereby exposed exteriorly. With this prior art carrier no provision is made for supporting the hoses used with the gas cylinders; as a result hoses are wrapped haphazardly around the cylinders and projecting portion of the back wall; and no provision is made for storage of accessory items.

In contrast to the prior art, the carrier of the present invention has a hose reel formed on the front wall with a partially closed outer end to provide a storage compartment, has double-walled bottom, back and side walls for added strength, has cylinder retaining recesses in the back wall with a corresponding divider in the front wall, and has rod supporting means located interiorly.

SUMMARY OF THE INVENTION

Briefly described the carrier of the present invention has bottom, back, front and side walls defining an open-topped enclosure for supporting gas cylinders. According to one feature of the invention, the front wall is formed with a reel thereon extending laterally outwardly therefrom for support of a hose wound thereon.

According to another feature of the invention the bottom, back and side walls are formed integrally and are hollow with an outer wall portion and an inner wall portion spaced inwardly of the outer wall portion. The inner wall portion at the back wall has upwardly extending recesses in the configuration of cylindrical sections extending upwardly from the bottom wall for confining gas cylinders therein.

According to a further feature of the invention the bottom, back and side walls are formed integrally and the front wall is attached to the bottom and side walls at connecting portions that preferably include shouldered tab engagement in lipped slots.

In the preferred embodiment of the present invention, all of the foregoing features are combined, the outer end of the reel is partially closed to form an article storage compartment within the reel, an inwardly extending divider segment is formed on the front wall to facilitate retention of gas cylinders in the recesses, and the inner wall portion of the back wall at the upper extent of the recesses is formed as a shoulder in which a hole is provided for receipt of welding rods or the like, which are supported on a shelf formed in the inner wall portion therebelow.

BRIEF DESCRIPTION OF THE DRAWINGS

FIG. 1 is a perspective view of a carrier for gas cylinders embodying the preferred embodiment of the present invention shown mounted on a cart and containing gas cylinders and hoses therefor;

FIG. 2 is a plan view of the carrier of FIG. 1;

FIG. 3 is a side elevation of the carrier of FIG. 1;

FIG. 4 is a front elevation of the carrier of FIG. 1 shown without gas cylinders and hoses and without the cart;

FIG. 5 is a side elevation of the carrier of FIG. 4;

FIG. 6 is a vertical sectional view taken along line 6—6 of FIG. 2;

FIG. 7 is a vertical sectional view taken along line 7—7 of FIG. 2;

FIG. 8 is a horizontal sectional view taken along line 8—8 of FIG. 4;

FIG. 9 is a horizontal sectional view taken along line 9—9 of FIG. 4;

DETAILED DESCRIPTION OF THE PREFERRED EMBODIMENT

Figure 10:
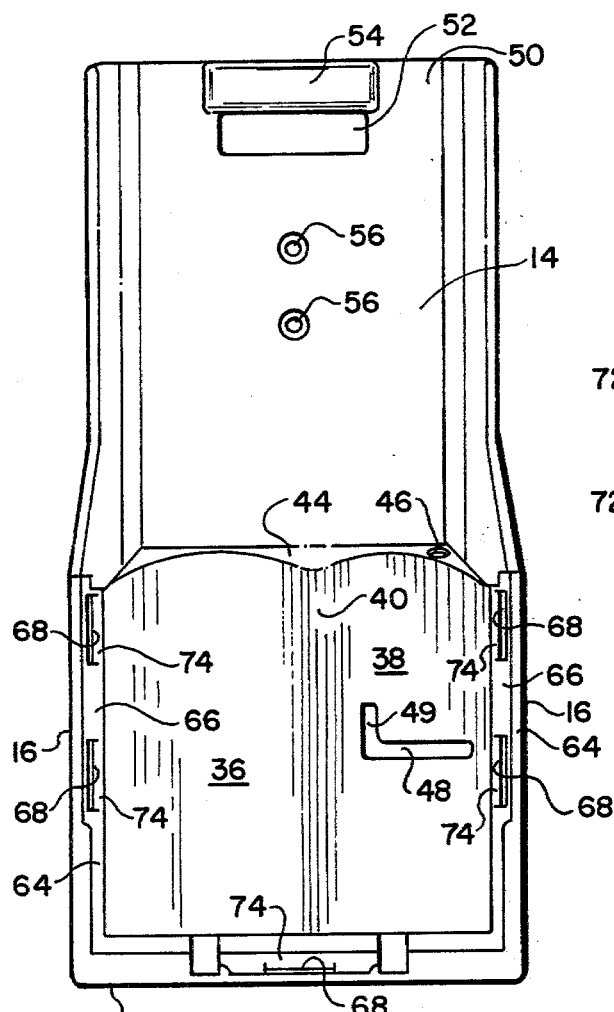
FIG. 10 is a front elevational view of the carrier of FIG. 4 with the front wall removed.
Figure 11:
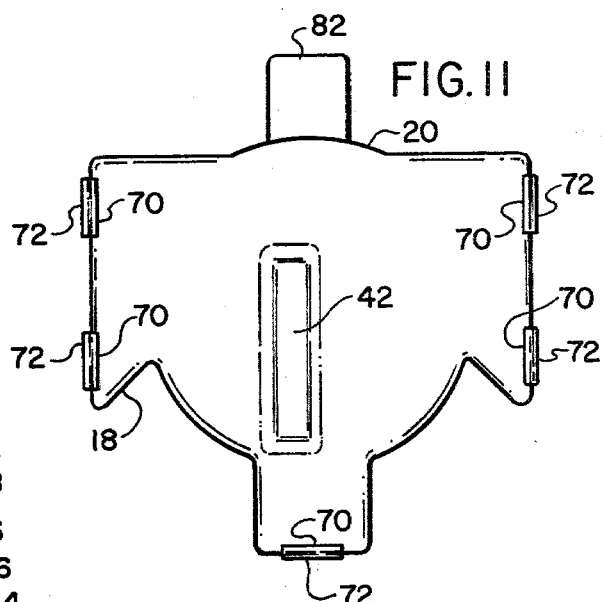
FIG. 11 is a rear elevational view of the front wall of the carrier of FIG. 4.

The carrier 10 of the preferred embodiment of the present invention illustrated in the accompanying drawings is formed with a bottom wall 12, a back wall 14, side walls 16 and a front wall 18, which combine to form an open-topped enclosure for containing a pair of gas cylinders C that have valves V and gages G from which hoses H extend and are wound on a reel 20 formed integrally on the front wall 18.

In this preferred embodiment the carrier 10 is mounted on a cart 22 that includes a platform 24 on which the carrier is mounted. The platform is supported on wheels 26 for portability and a flange 28 projects outwardly and downwardly from the platform 24 to support the carrier in an upright position when the cart 22 is at rest. A tubular handle 30 is secured to the back wall 14 and projects rearwardly and upwardly for manual manipulation of the carrier 10 and cart 22.

Preferably the carrier 10 is made of high density polyethylene that is blow molded to form in one piece the bottom wall 12, back wall 14 and side walls 16 as an integral unit, and to form the front wall 18 separately but with provision for assembly with the bottom, back and side wall unit.

The bottom wall 12, back wall 14 and side walls 16 are formed of a double walled construction with a hollow interior, thereby having an inner wall portion 32 spaced from an outer wall portion 34. These wall portions are generally parallel with a constant spacing therebetween except in the back wall 14 wherein the inner wall portion 32 is formed to provide upwardly extending recesses 36 and 38 in the configuration of cylindrical sections for retaining the gas cylinders C in spaced relation. The cylindrical section formed by each of the recesses is somewhat less than semi-cylindrical and forms an inwardly extending separator ridge 40. The outer edges of the recesses 36 and 38 merge with the side walls 16, which flair slightly divergently from the back wall 14. The recesses 36 and 38 extend from the bottom wall 12 upwardly throughout the major extent of the gas cylinders C for confining the cylinders from the bottom wall throughout the upward extent of the recesses. Facing the separator ridge formed by the recesses 36 and 38 is a divider segment 42 projecting inwardly from the front wall 18 and extending upwardly through a portion of the vertical extent of the front wall to facilitate retention of the gas cylinders C in the recesses.

One of the recesses 36 is larger than the other recess 38 to accommodate a larger gas cylinder C, which difference in size results in a slight lateral offset of the separator ridge 40 and divider segment 42 from the center of the carrier 10.

Adjacent the upper extent of the recesses 36 and 38 the inner wall portion 32 of the backwall 14 extends toward the outer wall portion 34 to form a shoulder 44. Advantageously, this shoulder 44 in the corner adjacent the smaller recess 38 has an opening 46 in the form of a circular hole for partial insertion of welding rods into the hollow back wall for storage therein. At a spacing below this opening 46 the inner wall portion 32 of the back wall 14 is formed with an interior shelf 48 (FIGS. 6, 9 and 10) extending toward the outer wall portion 34 for supporting the ends of welding rods that have been partially inserted through the opening 46 in the shoulder 44 thereabove. The shelf 48 is formed with an upward projection 49 laterally offset from the opening 46 toward the other recess 36 for limiting lateral movement of the ends of the rods on the shelf 48. The extent of the rods above the shoulder 44 are protected by the upwardly extending back wall 14 and upwardly extending rear portions 50 of the side walls 16. The back wall 14 extends upwardly, not only to provide protection for the rods and cylinders, but also to provide a handle for the carrier 10, for which purpose a hand hold slot 52 is formed adjacent the top of the back wall 14 with an enlarged grip portion 54 immediately above the slot 52. The back wall 14 also serves for attachment of the aforementioned tubular handle 30 by screws mounted in countersunk holes 56 in the back wall 14, with the inner wall portion 32 formed integrally with the outer wall portion 34 at the aforementioned countersunk holes 56.

For mounting of the carrier 10 on the platform 24 of the cart 22, a pair of rearwardly extending channels 58 are formed in the bottom wall 12 at which the inner wall portion 32 is integral with the outer wall portion 34. A pair of screw holes 60 are formed in each of the channels 58 for screwing of the carrier to the platform 24.

The front wall 18, like the other walls, is double walled and hollow, but does not completely cover the front of the carrier 10 between the side walls 16. Rather to allow access to the interior of the bottom of the carrier 10 and to reduce the amount of material used, the front wall 18 is open at both sides adjacent the bottom wall 12, but extends to the side walls 16 through the upper extent of the front wall 18 and extends downwardly to the bottom wall 12 for a limited lateral extent centrally of the front wall 18. Where the front wall 18 extends to the bottom wall 12 and side walls 16 it is attached thereto at connecting portions 62, which are shown as two connecting portions 62 along each side wall 16 and one at the bottom wall 12. To facilitate attachment of the front wall 18 to the bottom wall 12 and side walls 16, the edges 64 of the bottom wall 12 and side walls 16 that face the front wall 18 are formed with offsets 66 into which the front wall edges are seated. In these offsets 66 the connecting portions 62 are provided with locking means engaging in the offset edges for attaching the front wall 18 to the bottom wall 12 and side walls 16.

Figure 12:
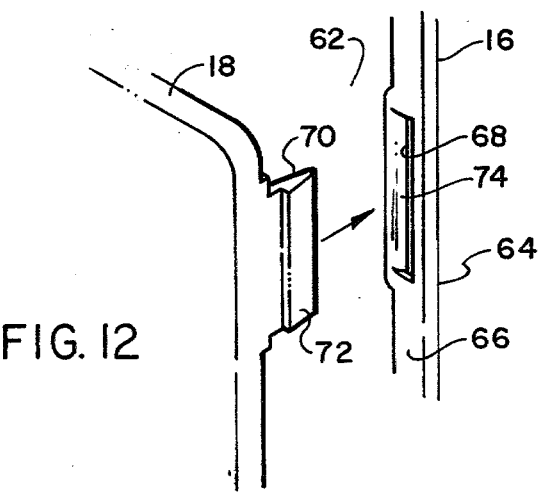
FIG. 12 is an enlarged exploded perspective view of one of the connecting portions at the juncture of the front wall and side walls of the carrier of FIG. 4.

The locking means, as shown particularly in FIG. 12, includes at each connecting portion 62 a slot 68 formed in the offset 66 of the bottom wall or side wall edge 64 and a rearwardly projecting tab 70 formed on the front wall 18 engageable in the slot 68. To retain the tab 70 in the slot 68, the tab 70 is formed with a shoulder 72 and a lip 74 is formed in the edge 64 projecting into the slot 68 on the side opposite the shoulder 72. Thus, upon insertion of the tab 70 into the slot 68 the shoulder will engage the inside of the edge 64 to prevent separation of the front wall 18 from the bottom wall 12 and side walls 16 and will be prevented from dislodgement by the pressure of the lip 74 against the tab 70.

The front wall 18, like the other walls, is formed with an inner wall portion 76 and an outer wall portion 78 spaced therefrom. The inner wall portion 76 extends generally flat, except for the aforementioned divider segment 42 and the outer wall portion 78 is generally parallel to the inner wall portion 76 in the areas between the reel 20 and the adjacent bottom wall 12 and side walls 16, but extends laterally outwardly to form the reel 20 integrally on the front wall 18 in a cylindrical configuration having a laterally outward end 80 that is circular. The reel is integrally formed with a plurality of hose retaining tabs 82 that extend radially from the outer end 80 of the reel 20. In the illustrated embodiment there are three hose retaining tabs 82, one extending from the top of the reel 20 and the other two extending diagonally from the lower portion of the reel. These tabs 82 extend radially a sufficient amount to retain hoses H on the reel 20.

The reel 20 is formed with a partial end wall 84 extending across the lower portion of the end 80 with the upper portion of the end being open to allow access into the interior of the hollow reel 20, which thereby defines an article storage compartment 86 in which welding accessory items or other items of any kind may be stored for convenient access and transportation with the gas cylinders C with which they are associated. In the illustrated embodiment, the outer end 80 of the reel 20 is circular and the partial end wall 84 is semi-circular, leaving ample access room into the compartment 86 while providing substantial storage space therein.

The carrier 10 of the preferred embodiment is particularly applicable for carrying welding equipment such as acetylene and oxygen cylinders C and associated hoses H and nozzle N. For transportation and storage the hoses H are wound on the reel 20 and the nozzle N is wedged on one of the hose retaining tabs 82. In this condition the carrier 10 can be rolled on the cart 22 to any suitable location at which the hoses H can be unwound and the equipment used for welding, following which the hoses can be rewound on the reel for further storage or transportation.

While being of particular advantage in the field of welding, the carrier 10 of the present invention can be used in the same or modified form and in varying dimensions for carring gas cylinders of various types, such as for medical or dental use or for any other use, and it should be understood that the carrier 10 can not only be transported on the aforementioned cart 22 or manually by using the hand hole 52, but it can also be advantageously adapted for convenient transport on the back of a user by attaching back straps with an end of each strap attached around the hand grip 54 and the other end on a bracket that can be attached to the bottom back portion of the side walls 16.

It should also be understood that the invention is not intended to be limited by the foregoing detailed disclosure or otherwise except as it is defined in the appended claims and equivalents thereof.

I claim:

1. A carrier for gas cylinders and the like and hoses associated therewith comprising bottom, back, front and side walls defining an open-topped enclosure for supporting gas cylinders, said front wall having a reel thereon extending laterally outwardly therefrom for support of a hose wound thereon, said reel being hollow and having a partial end wall extending across the lower portion of the laterally outward end of said reel with the upper portion of said laterally outward end being open, said hollow reel and partial end wall thereby defining an article storage compartment within said reel.

2. A carrier according to claim 1 and characterized further by a plurality of hose retaining tabs extending from said reel for retaining wound hose on said reel.

3. A carrier according to claim 1 and characterized further in that said reel is cylindrical, said laterally outward end of said reel is circular and said end wall is generally semi-circular.

4. A carrier for gas cylinders and the like and hoses associated therewith comprising bottom, back, front and side walls defining an open-topped enclosure for supporting gas cylinders, said front wall having a reel thereon extending laterally outwardly therefrom for support of a hose wound thereon and said bottom, back and side walls being formed integrally and being hollow, said bottom and side walls having edges facing said front wall and having offsets in said edges for seating of said front wall therein, and locking means engaging in said offset edges for attaching said front wall to said bottom and side walls.

5. A carrier for gas cylinders and the like and hoses associated therewith comprising bottom, back, front and side walls defining an open-topped enclosure for supporting gas cylinders, said front wall having a reel thereon extending laterally outwardly therefrom for support of a hose wound thereon and said back wall being hollow, having an outer wall portion and an inner wall portion spaced inwardly of said outer wall portion, said inner wall portion having upwardly extending recesses in the configuration of cylindrical sections extending upwardly from said bottom wall for confining gas cylinders therein.

6. A carrier according to claim 5 and characterized further in that said front wall has a divider segment projecting inwardly and extending upwardly to facilitate retention of gas cylinders in said recesses.

7. A carrier according to claim 5 and characterized further in that said inner wall portion of said back wall extends toward said outer wall portion adjacent the upper extent of said recesses to form a shoulder, and said shoulder having an opening therein for partial insertion of welding rods or the like into said hollow back wall for storage therein.

8. A carrier according to claim 7 and characterized further in that said inner wall portion of said back wall is formed with an interior shelf extending toward said outer wall portion below said opening, said shelf supporting the ends of welding rods or the like that have been partially inserted through the opening in said shoulder.

9. A carrier for gas cylinders comprising bottom, back, front and side walls defining an open-topped enclosure for supporting gas cylinders, said bottom, back and side walls being formed integrally and being hollow with an outer wall portion and an inner wall portion spaced inwardly of said outer wall portion, said inner wall portion at said back wall having upwardly extending recesses in the configuration of cylindrical sections extending upwardly from said bottom wall for confining gas cylinders therein, said front wall being hollow with an inner wall portion and a partial outer wall portion spaced outwardly of said inner wall portion and defining an article storage compartment within said hollow front wall.

10. A carrier according to claim 9 and characterized further in that there are a pair of said recesses and said front wall is formed with a divider segment projecting inwardly and extending upwardly generally between said recesses to facilitate retention of gas cylinders in said recesses.

11. A carrier for gas cylinders according to claim 9 and characterized further in that said bottom and side walls are attached to said front wall at connecting portions.

12. A carrier according to claim 11 and characterized further in that said bottom and side walls have edges facing said front wall and have offsets in said edges for seating of said front wall therein, and said connecting portions have locking means engaging in said offset edges for attaching said front wall to said bottom and side walls.

13. A carrier according to claim 12 and characterized further in that said locking means comprises slots formed in said edges and retaining lips projecting into said slots, and tabs projecting from said front wall for insertion in said slots and having shoulders formed thereon for retaining engagement within said slots.

14. A carrier for gas cylinders comprising bottom, back, front and side walls defining an open-topped enclosure for supporting gas cylinders, said bottom, back and side walls being formed integrally and being hollow with an outer wall portion and an inner wall portion spaced inwardly of said outer wall portion, said inner wall portion at said back wall having upwardly extending recesses in the configuration of cylindrical sections extending upwardly from said bottom wall for confining gas cylinders therein, and said inner wall portion of said back wall extending toward said outer wall portion adjacent the upper extent of said recesses to form a shoulder, said shoulder having an opening therein for partial insertion of welding rods or the like into said hollow back wall for storage therein.

15. A carrier according to claim 14 and characterized further in that said inner wall portion of said back wall is formed with an interior shelf extending toward said outer wall portion below said opening, said shelf supporting the ends of welding rods or the like that have been partially inserted through the opening in said shoulder.

16. A carrier according to claim 15 and characterized further in that said shelf is formed with an upward projection for limiting lateral movement of the ends of rods on said shelf.

17. A carrier for gas cylinders comprising bottom, back, front and side walls defining an open-topped enclosure for supporting gas cylinders, said bottom, back and side walls being formed integrally, and said bottom and side walls being hollow with edges facing said front wall and offsets in said edges for seating of said front wall therein, and locking means engaging in said offsets for attaching said front wall to said bottom and side walls, whereby said front wall is essentially nonremovable from said bottom and side walls.

18. A carrier according to claim 17 and characterized further in that said locking means comprises slots formed in said edges and retaining lips projecting into said slots, and tabs projecting from said front wall for insertion in said slots and having shoulders formed thereon for retaining engagement within said slots.

* * * * *